July 26, 1966

JAMES E. WEBB
ADMINISTRATOR OF THE NATIONAL AERONAUTICS
AND SPACE ADMINISTRATION
EMERGENCY ESCAPE SYSTEM 3,262,518

Filed Oct. 29, 1964

INVENTOR.
WOLFGANG G. OFFIK

BY
J. Wm. McCoy
B. E. Smallwood.
ATTORNEYS

July 26, 1966

JAMES E. WEBB
ADMINISTRATOR OF THE NATIONAL AERONAUTICS
AND SPACE ADMINISTRATION
EMERGENCY ESCAPE SYSTEM 3,262,518

Filed Oct. 29, 1964

INVENTOR.
WOLFGANG G. OFFIK

BY

ATTORNEYS

3,262,518
EMERGENCY ESCAPE SYSTEM
James E. Webb, Administrator of the National Aeronautics and Space Administration, with respect to an invention of Wolfgang G. Offik
Filed Oct. 29, 1964, Ser. No. 407,603
12 Claims. (Cl. 182—191)

This invention relates generally to an apparatus and method of personnel escape from tall structures and more particularly to an apparatus and method of personnel escape from tall structures in which there is a danger of explosive destruction of the structure and the spraying on the ground area around the structure of flaming liquids and other hazardous materials.

The problem of escape from tall buildings and other structures has existed for a long period of time. Devices and methods have been developed to facilitate the escape of personnel from burning buildings including the familiar fire escape stairs or ladders. Such systems were adequate for use in the case of fires where no explosions were anticipated and the personnel expected to use the equipment were untrained in its use.

Such methods of escape becomes less adaptable when taller structures are considered, and, when the possibility of explosions exists when an emergency arises, these methods and devices have proved to be entirely inadequate. This situation is encountered in facilities testing or using explosive, inflammable or otherwise hazardous materials. An obvious area in which the tall structure and explosion possibility exists is a missile launch complex when a missile is being readied for launch or a test firing of the booster rocket engines. The gantry used in conjunction with a large missile on a launch pad could be considered an instance where such danger exists for personnel working in readying the missile for launching. The use of high energy fuels such as liquid hydrogen and liquid oxygen as propellants in upper stages as Saturn program vehicles creates an extreme hazard because of the very violent explosive reaction which may occur when these two cryogenic liquids come in contact with each other except under controlled conditions.

It is necessary to provide an escape means to enable personnel working high above the ground level in such an environment where the danger of explosive destruction of a missile, gantry or other structure upon which the personnel are working, to escape from the structure to a safe position. Also the possibility of flaming liquids covering the ground area around the structure must be provided for. Generally the warning time in such situations will be very short indeed, and this fact must be taken into consideration.

It is therefore an object of the present invention to provide means for emergency escape of personnel from tall structures.

It is another object to provide a personnel escape apparatus which will allow personnel to escape from tall structures in the presence of immediate danger of an explosion.

It is a further object of the present invention to provide a means and method for personnel to escape from tall structures in the presence of danger of immediate explosive destructure of the structure upon which the personnel are working.

It is still another object of the present invention to provide an escape from tall structures for personnel working thereon which will remove the personnel quickly away from danger of injury upon the explosive destruction of the structure and widespread spraying of burning liquid and solid fuels and other ignited inflammable materials.

It is also an object of the invention to provide a means of escape of personnel from tall structures which is adaptable for use as a training apparatus for the personnel expected to use the apparatus in an emergency escape from the structure.

These and other objects of the invention, obvious to those skilled in the art, are accomplished by providing an enclosure or rescue cabin in which personnel may descend from the upper portions of tall structures when the danger of explosive destruction or serious damage to the structure is imminent. The enclosure is guided to a position below the ground level by a guide cable which is stressed to a prescribed tension. The rescue cabin crashes through a dome shaped roof of a blast shelter and is brought to a stop by a deceleration system including a spike on the rescue cabin which penetrates a bed of granular material. A speed control system is provided to limit the velocity of the rescue cabin to a prescribed maximum descent rate. When the rescue cabin has come to rest in the blast shelter, the occupants depart the cabin and proceed along an underground tunnel to safety. The dome shaped blast shelter roof keeps any liquid explosive material from entering the blast shelter prior to the rescue cabin crashing therethrough, and, after the rescue cabin has come to rest in the blast shelter, only the area of the roof broken by the descending spiked rescue cabin is open. Thus even if propellants are falling on the blast shelter area, only a small portion thereof falling on the open portion of the shelter roof will be able to enter the shelter; no flaming liquids will be able to run in the shelter from the ground area around the shelter roof. The shelter roof is adapted for easy replacement to allow training of the rescue system and the rescue cabin may be returned to its ready position by a motor cable system which is provided as a part of the cabin descent speed control system.

Greater understanding of the invention may be obtained by reference to the following detailed description of an embodiment thereof taken in conjunction with the attached drawings in which.

Figure 1:
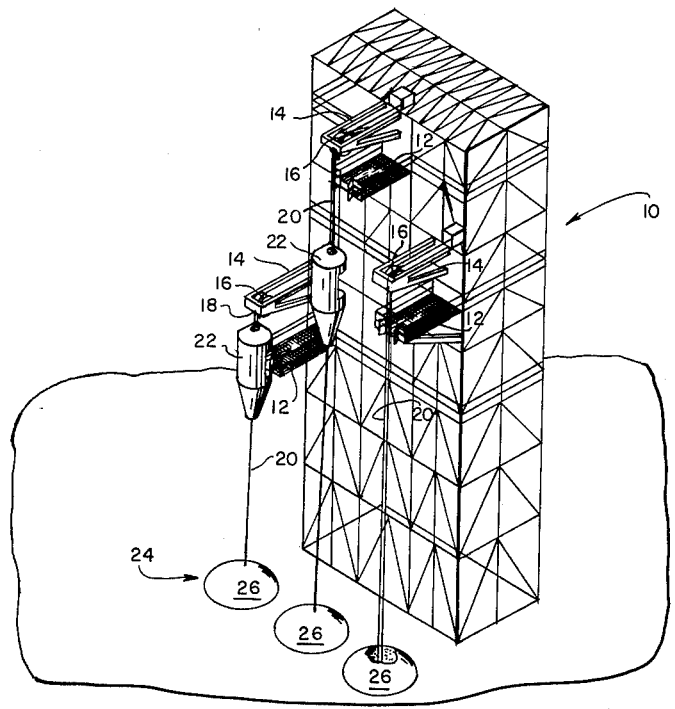
FIGURE 1 is a perspective view of a tall structure with three rescue cabins in various positions during an emergency rescue operation.

Referring now to the drawings and particularly to FIGURE 1, a tall structure 10 such as a missile launch pad gantry has several levels upon which personnel are working. At each of the working levels on the structure 10 there is provided a loading platform 12 and a support arm 14. At the distal end of the cantilever support arm 14 there is a hoist cable pulley 16 and an attachment 18 for guide cable 20. Guide cable 20 passes longitudinally through but is not attached to a rescue cabin 22 while the rescue cabin 22 is held in place by a hoist cable as will be pointed out hereinafter in conjunction with the discussion of FIGURE 2. Guide cable 20 is attached at its other end in an underground blast shelter 24 which has a dome shaped roof 26.

Figure 2:
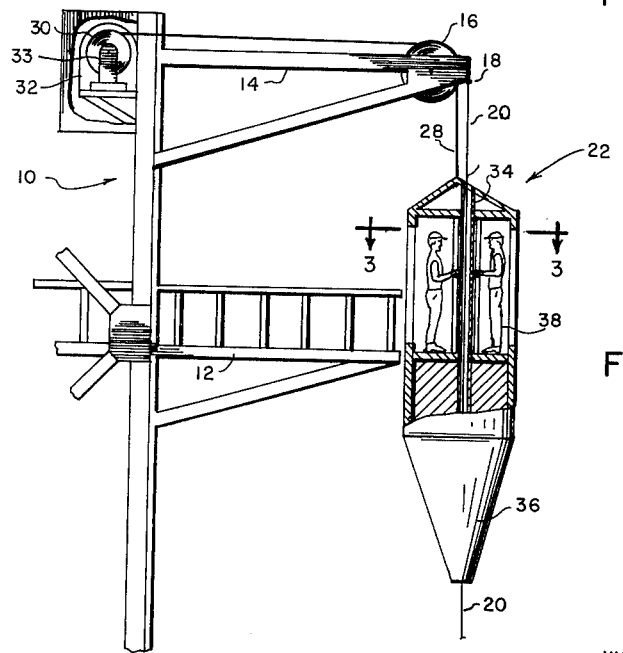
FIGURE 2 is an elevational view of the rescue cabin and support arm with the rescue cabin shown partly in section.

Referring now to FIGURE 2, there is shown the support arm 14, hoist cable pulley 16, guide cable attachment 18, guide cable 20 and rescue cabin 22. There is attached to the top of the rescue cabin 22 a hoist cable 28 which passes over hoist cable pulley 16 and is attached at its other end to a drum 30 on a hoist motor 32. A speed control brake 33 is provided which holds the cabin in place ready for use and also controls the rotational velocity of drum 30 thus controlling the descent velocity of the rescue cabin. Guide cable 20, as mentioned above, passes through a guide tube 34 in the rescue cabin 22 which extends longitudinally from the top of the cabin to a pointed spike 36 at its lower end. Within the cabin there is provided an annular shaped personnel compartment 38 extending around guide tube 34.

Figure 3:
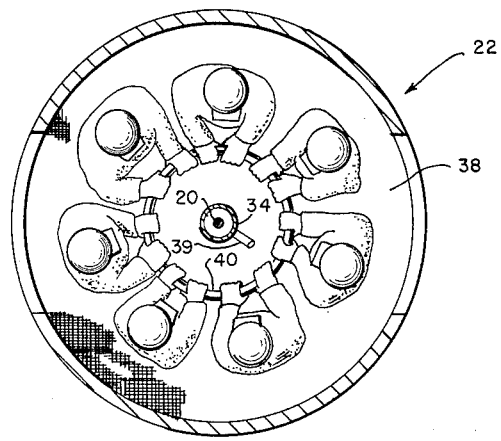
FIGURE 3 is a sectional view of the rescue cabin taken along the section 3—3 of FIGURE 2.

FIGURE 3 shows the personnel compartment 38 with workers in position for descent to the blast shelter. In the center of the rescue cabin there is the guide tube 34, a speed control brake release lever 39, which is connected to speed controlled brake 33 in a conventional manner and a circular rail grip 40.

Figure 4:
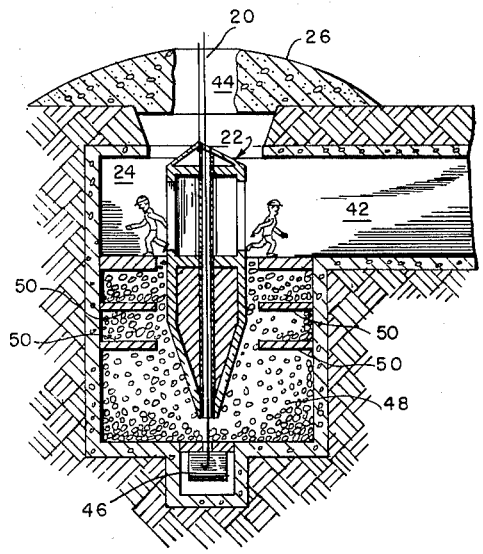
FIGURE 4 is a sectional view of the blast shelter showing the rescue cabin at rest after crashing through the dome shaped blast shelter roof.

Referring now to FIGURE 4, the rescue cabin 22 is shown after it has come to rest in the blast shelter 24. The workers are shown leaving the rescue cabin and proceeding along a tunnel 42 to safety. Prior to coming to rest, the rescue cabin 22 crashed through the dome shaped roof 26 of the blast shelter leaving an opening 44 in the apex thereof. The blast shelter roof 26 is constructed of material having a low maximum shearing stress particularly under the dynamic impact of the rescue cabin 22 such that the size of the opening 44 is substantially the same as the cabin cross section. The rescue cabin descends from the loading platform 12 (see FIGURES 1 and 2) being guided by guide cable 20 which is stressed to an optimum tension by anchoring weight 46 in the bottom of a granular material filled deceleration bed 48. The deceleration bed 48 has force dispersion discs 50 extending circumferentially around the cabin impact area. The granular material acts as a deceleration bed when the spiked portion of the cabin 22 crashes through the roof 26 of the blast shelter 24 and embeds itself in the deceleration bed.

A particular rescue system will have a predetermined rescue cabin gross weight and distance for the rescue cabin to fall and also a predetermined maximum rate of descent controlled by the speed control brake 33. The depth of penetration of the cabin and type of granular material to be used in the deceleration bed 48 is subject to analytical determination.

The rescue cabin may be maintained in its normal loading position by the speed control brake 33 restraining rotational movement of drum 30. Alternatively, the cabin could be held in place by gripping means (not shown) in the rescue cabin which would grip guide cable 20. Kinetic energy is imparted to the rescue cabin by someone in the rescue cabin throwing the brake release lever 39 to release the brake 33. Throughout the descent the brake is then used to limit the rotational velocity of drum 30.

The rescue system may be used as a training device, and therefore the spike 36 in the lower end of the rescue cabin 22 is constructed of material capable of withstanding repeated deceleration penetrations of the blast shelter roof 26 and the granular material in the deceleration bed 48. After such a training descent of the rescue cabin, hoist motor 32 is used to pull the rescue cabin back to its normal position at its loading platform 12 as shown in FIGURE 2, and a new dome shaped roof is installed.

The operation of the rescue system will now be briefly recapped. The rescue cabin 22 is held in the normal loading position shown in FIGURE 2 by a brake applied to drum 30 upon which hoist cable 28 is wound. Upon an emergency signal being sounded, all workers on a particular level enter the rescue cabin and hold gripping bar 40 while remaining in a standing position. In the event there are more workers on a particular level than can be accommodated in a single rescue cabin, additional rescue systems may be utilized. Also, if desired, seats may be placed in the rescue cabins; however this is not considered necessary or desirable. When a particular rescue cabin is filled or all personnel to ride in the cabin are in place, the speed control brake 33 is released and the cabin begins its descent being guided by guide cable 20. The speed control brake 33 keeps the angular velocity of the drum 30 below a predetermined maximum value thus controlling the maximum velocity of the cabin. The rescue cabin's spiked lower portion 36 crashes through the blast shelter dome roof leaving an opening 44 therein and embeds itself in a deceleration bed 48. The spike shaped lower portion 36 of the rescue cabin allows a uniform onset of deceleration forces. The deceleration bed 48 is composed of a granular material such as gravel, wheat or other material. The splashing effect of the material caused by the impact of the spiked portion of the rescue cabin is reduced by force dispersion annular discs 50 which restrain the upward motion of the granular particles around the embedding rescue cabin. When the rescue cabin comes to rest, the occupants leave the cabin and depart the blast shelter area by tunnel 42 to an area of greater safety. Prior to the time the rescue cabin crashes through the blast shelter dome shaped roof 26, any burning liquids which may be covering the ground area around the structure 10 are kept out of the blast shelter. After the rescue cabin has crashed through the roof, the opening 44 will allow a limited amount of burning material to enter the blast shelter; however, only burning material descending on the shelter roof will be able to enter, and burning liquids on the ground around the shelter will still be prevented from flowing in because of the elevated contour of the shelter roof 26.

The rescue system thus allows quick escape from tall structures even though there is already a fire burning and inflamable liquid and other materials on the ground around the structure 10. Also an explosion in or around the structure 10 after the rescue cabin has crashed through the roof of the blast shelter will have a greatly reduced injurious effect on the escaping personnel and possibly none at all.

The dome shaped roof 26 could alternatively have a punch out plug in the crash through area so that the opening 44 would be of a prescribed shape and size. Also a conical metal cap could be attached to the upper portion of the rescue cabin which would break off upon contact with the edge of the blast shelter roof and thus form a seal of opening 44 and prevent flaming material from entering the shelter even after the rescue cabin has come to rest. The blast shelter would then be a true protection against an explosive blast above the shelter. The blast shelter roof could also be placed on an elevated cylindrical concrete wall extending vertically up from the ground level and above the blast shelter. Such a wall would keep flaming liquids and other hazardous materials out of the blast shelter just as the dome shaped contour of the blast shelter roof 26. The "dome shaped" characterization is meant to apply also to this configuration.

There has been described the invention in its novel aspects; however, it is to be understood that there has been shown merely an embodiment of the invention and that the invention is not to be limited to the structure shown and described. The present embodiment is therefore to be considered in all respects illustrative and not restrictive. Obviously numerous modifications and variations of the present invention within the invention's true spirit are possible in light of the above teachings. It is therefore to be understood that within the scope of the appended claims the invention may be practiced otherwise than as specifically described herein.

What is claimed is:

1. A rescue system for providing safe escape of personnel from tall structures comprising:
 (a) a rescue cabin;
 (b) a blast shelter having a dome shaped roof; and
 (c) means for guiding said rescue cabin into said blast shelter;

(d) said rescue cabin has attached thereto means for crashing through said dome shaped shelter roof;
(e) whereby burning liquid and fragmentary solid material are prevented from flowing into said shelter prior to entry of said rescue cabin therein.

2. The rescue system of claim 1 wherein said means for guiding said rescue cabin into said blast shelter includes:
(a) a guide tube extending longitudinally through said rescue cabin; and
(b) a guide cable extending from the position on said structure from which personnel are to escape into said blast shelter and through said guide tube.

3. The combination of claim 2 wherein said means for guiding said rescue cabin into said blast shelter is adapted to guide said rescue cabin through the apex of said dome shaped roof.

4. The rescue system of claim 3 which includes means for returning said rescue cabin from said blast shelter to its normal loading position.

5. A rescue system for providing safe escape of personnel from tall structures comprising:
(a) a rescue cabin;
(b) a blast shelter having a dome shaped roof;
(c) means for providing said rescue cabin with kinetic energy;
(d) means for guiding said rescue cabin from said structure into said blast shelter;
(e) means attached to said rescue cabin for crashing through said dome shape roof of said blast shelter at the apex thereof; and
(f) means for dissipating the kinetic energy of said rescue cabin when said rescue cabin is in said blast shelter.

6. The rescue system of claim 5 wherein said blast shelter is underground.

7. The combination claimed in claim 5 wherein said combination includes a speed control means for limiting the velocity of said rescue cabin as it is being guided from said structure to said blast shelter.

8. The rescue system of claim 5 which includes means for returning said rescue cabin from said blast shelter to its normal loading position.

9. The rescue system claimed in claim 5 wherein:
(a) said rescue cabin has a spike shaped lower portion which provides said means for crashing through the dome shaped blast shelter roof; and
(b) said means for dissipating said kinetic energy when said rescue cabin is in said blast shelter includes a deceleration bed of granular material in the bottom of said blast shelter under the apex of said dome shaped roof into which the spike shaped lower portion of said rescue cabin is adapted to penetrate.

10. The rescue system of claim 9 wherein said deceleration bed has force dispersion means therein for reducing the splashing effect of said granular material when said spike shaped lower portion of said rescue cabin penetrates said deceleration bed.

11. The method of rescuing personnel from tall structures comprising the sequential steps of:
(a) providing a rescue cabin in the region of the structure from which personnel are to escape;
(b) loading said personnel in said cabin;
(c) providing said rescue cabin with kinetic energy;
(d) guiding said rescue cabin from said structure into a blast shelter by:
(1) guiding said rescue cabin to a dome shaped roof of said blast shelter;
(2) crashing said rescue cabin through said dome shaped roof at the apex thereof; and then
(3) guiding said rescue cabin to a deceleration bed in said blast shelter;
(e) dissipating the kinetic energy of said rescue cabin when said cabin is said blast shelter by the penetration of the lower portion of said rescue cabin into said deceleration bed.

12. The method of claim 11 wherein said method includes the step of limiting the velocity of said rescue cabin after kinetic energy has been provided thereto and while said rescue cabin is being guided from said structure to said blast shelter.

References Cited by the Examiner

UNITED STATES PATENTS

| | | | |
|---|---|---|---|
| 259,279 | 6/1882 | South | 182—191 X |
| 857,338 | 6/1907 | Fitch | 272—6 |
| 2,132,908 | 10/1938 | Strong | 272—6 |
| 2,229,201 | 1/1941 | Williford | 272—6 |
| 2,311,171 | 2/1943 | Hawthorne | 272—6 |

FOREIGN PATENTS 55,966   4/1912   Switzerland.

HARRISON R. MOSELEY, *Primary Examiner.*
REINALDO P. MACHADO, *Examiner.*